United States Patent [19]

Fawzy

[11] Patent Number: 4,459,501
[45] Date of Patent: Jul. 10, 1984

[54] TOROIDAL GENERATOR AND MOTOR WITH RADIALLY EXTENDED MAGNETIC POLES

[75] Inventor: Moharram M. Fawzy, Malvern, Pa.

[73] Assignee: Intra-Technology Assoc. Inc., Malvern, Pa.

[21] Appl. No.: 503,914

[22] Filed: Jun. 13, 1983

[51] Int. Cl.³ .......................................... H02K 21/16
[52] U.S. Cl. .................................. 310/156; 310/164; 310/268
[58] Field of Search ............... 310/112, 156, 164, 257, 310/263, 268

[56] References Cited

U.S. PATENT DOCUMENTS

| | | | |
|---|---|---|---|
| 3,330,975 | 7/1967 | Osterwalder | 310/164 |
| 3,459,982 | 8/1969 | Cartser | 310/43 |
| 3,469,133 | 9/1969 | Stcherbatcheff | 310/164 |
| 3,849,682 | 11/1974 | Binns | 310/156 |
| 3,904,902 | 9/1975 | Inariba | 310/154 |
| 3,993,920 | 11/1976 | Sato | 310/154 |
| 4,143,288 | 3/1979 | Sato | 310/66 |

FOREIGN PATENT DOCUMENTS 233313  4/1961  Australia ............................ 310/268

Primary Examiner—J. D. Miller
Assistant Examiner—D. L. Rebsch
Attorney, Agent, or Firm—John S. Munday

[57] ABSTRACT

An electromechanical device which can be used as a motor or as a generator has a housing, including bearing means to support a rotatable shaft. A pair of disc magnets are poled to have opposite polarity on the two faces of each. The magnets are mounted face to face together on the shaft to define a rotor.

The device includes at least one first pole shoe in contact with one face of each magnet, and having a portion extending radially therefrom to define, in its preferred form, a pair of virtual pole chambers, of the same polarity as said one face. Also included is at least one second pole shoe in contact with the other face of each magnet and having a portion extending radially therefrom to define in its preferred form a pair of virtual pole chambers of the same polarity as the other face. A toroid stator is mounted on the housing and has windings thereon. The stator is positioned annularly around the disc magnets such that the virtual pole chambers of the first and second pole shoes surround portions of said windings with circumferentially alternating fields of alternating polarity. Means for electrical contact with the stator draw off current when the device is operated as a generator, or provide current to operate the device as a motor.

8 Claims, 5 Drawing Figures

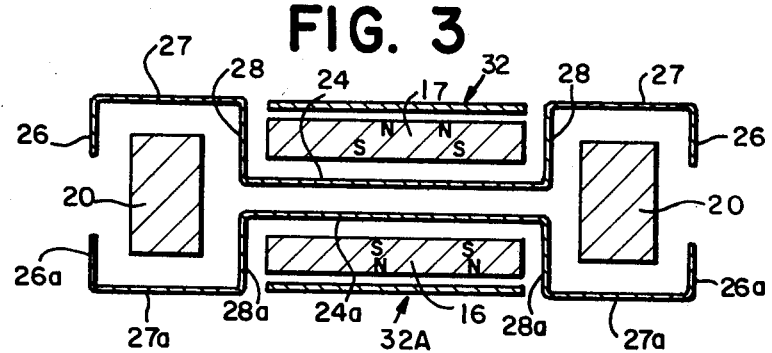
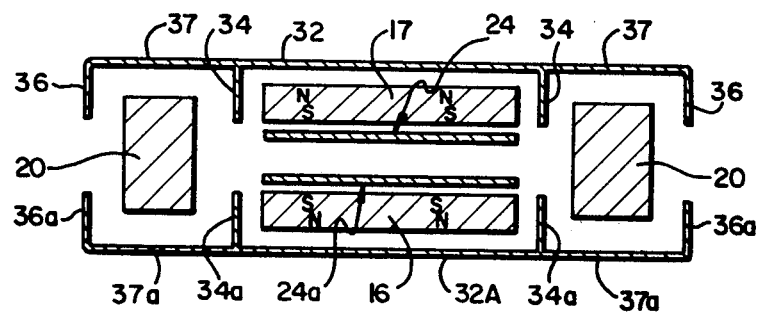
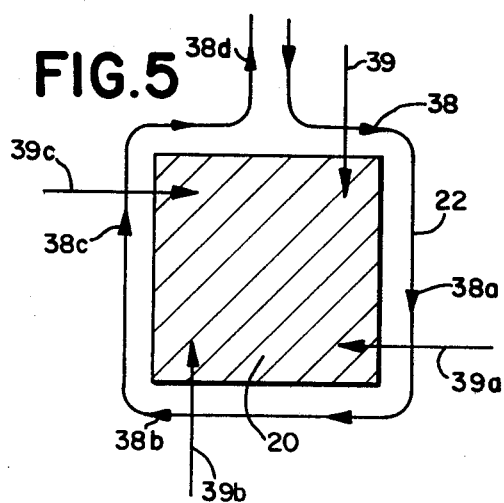

TOROIDAL GENERATOR AND MOTOR WITH RADIALLY EXTENDED MAGNETIC POLES

BACKGROUND OF THE INVENTION

This invention relates to an electromechanical device which can be used as a generator, electric motor, and other types of magnetic rotating components including polyphase generators and motors, steppet motors, brushless motors and the like. Because of the design, the device is admirably suited for use where flat or "pancake" designs are used.

Many electromechanical devices have been designed heretofor with varying efficiencies and ability. When size and shape are of no concern, motors and generators which utilize electrical power can be built for almost any purpose with good success. This is particularly true when the cost of the device is not considered. Difficulties and inefficiencies occur when other criteria, such as size, shape, cost etc. are incorporated into the design.

One such example of where design requirements place a burden on the motor is disclosed in U.S. Pat. No. 4,225,798, to Barrett. In Barrett, a long thin motor is disclosed which is suitable for operating automobile window opening and closing apparatus mounted in a hollow door of the vehicle. As is taught therein, considerations of space, weight and configuration have caused conventional motor design to be inadequate, particularly if they are of the common cylindrical construction. The inadequacy of cylindrical motors is clearly taught in Barrett. Another example of disadvantages of cylindrical design, when the length of the cylinder is shortened is shown in U.S. Pat. No. 4,283,647 to Herr etal. Leakage is obviously a major problem.

To obviate the design limitations shown therein, Barrett has proposed a design which includes a structure having at least two permanent magnets and at least two field shoes. Each field shoe has an arcuate surface which forms one side of an air gap between the shoe and the armature. The field shoe has a thickness and crosssectional area which varies substantially in proportion to the density of magnetic flux carried by the shoe. Also the air gap is varied by constructing the shoe in a non-concentric shape. the preferred design includes two magnets and shoes, and is reported to be a powerful motor for its given size and weight. The design requirements call for a number of shaped parts for close tolerance and cooperation during the operation of the motor.

Another electromechanical machine of a flat or "pancake" design is disclosed in U.S. Pat. No. 4,188,556, to Hahn, which teaches the use of flat stator members having a circular array of magnets arranged in a suitable manner. Nevertheless, to increase power it is necessary to increase the number of magnets, thus increasing cost, weight and construction difficulties.

Other "pancake" motors which have significant power limitations are described in U.S. Pat. No. 3,315,106, to Reyst etal. In Reynst etal, the difficulties incurred with the use of printed circuit rotor discs are set forth. Reynst etal suggests the use of laminated rotors to overcome the limitations of printed circuits. U.S. Pat. No. 3,348,086 to Monma discloses another flat motor, in which flat coils are arranged on the core in a specified manner. Another such patent, which uses permanent magnet stators, is U.S. Pat. No. 3,469,133, as does the design taught in U.S. Pat. No. 3,904,902, in U.S. Pat. No. 3,993,920 and in its related U.S. Pat. No. 4,143,288.

Nevertheless, none of the above or other patents teach that a motor or generator can be designed which optimizes the ratio of the active length of a winding turn, or which permits addition of virtual poles without resorting to addition of actual magnets to reduce the core size needed for a given performance. Accordingly it is an object of this invention to provide an electromechanical device which is of high efficiency and power with low cost and without intricate or complicated design. It is an object to create a motor/generator using only two disc magnets yet having the ability to increase the number of virtual poles.

SUMMARY OF THE INVENTION

The foregoing and additional objects are achieved in accordance with the principles of this invention as follows. An electromechanical device useful as a motor or as a generator is provided, having a housing shaped as desired. In the housing bearing means are provided to support a rotatable shaft which can be connected to whatever equipment the device is to be used with.

A pair of disc magnets are poled to have opposite polarity on the faces thereof, and are positioned against one another with faces of similar polarity facing each other. They are mounted on the shaft to define a rotor. Also associated with each magnet is at least one first pole shoe, in contact with the commonly facing poles of the disc magnets, and having portions extending radially from the face to define in its preferred form a pair of virtual pole chambers of the same polarity as the one face of the magnet. At least one second pole shoe is provided in contact with the other face of each disc magnet and has portions extending radially from these two other faces, to define similarly a pair of virtual poles of the same polarity as these other faces of the disc magnets. A toroid stator is mounted on the housing, and has toroidal windings thereon of conventional design. The stator or toroid is positioned annularly around the disc magnets such that the first and second pole shoes surround portions of the windings with alternating fields of polarity. Up to 95% of the active winding is enclosed by the shoes. Means for electrical contact with the stator, of conventional design to either supply current in the motor configuration or receive current in the generator mode, are provided.

In a preferred embodiment, a pair of disc magnets are poled to have opposite polarity on their faces and are positioned to have faces of a first polarity facing one another, so that the faces of the second polarity are facing outward. The first pair of pole shoes is positioned to contact both of said two inner disc magnet faces which are facing each other and each has a portion which extends radially to define a uniquely shaped pair of virtual pole chambers of this first polarity. A pair of second pole shoes are positioned so that each will contact one of the two outer faces of the disc magnets and has a portion which extends radially to define a pair of uniquely shaped virtual pole chambers of the same polarity as this second or outer pair of disc magnet faces. By providing at least two first pole shoes and at least two second pole shoes, the number of virtual poles of alternating polarity which surround the toroid can be doubled. More pairs of pole shoe extensions will permit the number of virtual poles to be increased to any desired number without adding any new magnets. This change in the number virtual poles without change in the number of magnets is a great advantage and provides much versatility for these motors and generators.

The most preferred configuration for the first pole shoe includes a flat portion which covers the face of the disc magnets which is facing inward and a pair of cup portions which define a chamber sized to accept the toroid. The additional first pole shoe for the other inward facing portion of the other disc magnet cooperatively defines a chamber whereby the toroid is totally encircled, except for allowance for toroid mounting, by a virtual pole of the same polarity as the two inward faces of the magnets. Each of the magnets has a second pole shoe covering the outward face and having a cup portion which cooperates with the other second pole shoe to define a chamber surrounding the toroid as in the first pole shoe. These two chambers are each designed to be adjacent to 100% of the length of winding on the toroid, exclusive of the allowance for mounting the toroid.

BRIEF DESCRIPTION OF THE DRAWINGS

The foregoing and other objects of this invention and the particular feature of various embodiments will be more clearly understood from the following detailed description thereof, when read in conjunction with the accompanying drawings, in which:

FIG. 3 is a schematic view illustrating one part of the preferred embodiment;

FIG. 4 is another schematic view illustrating another part of the preferred embodiment; and FIG. 5 is a schematic diagram illustrating the operation of the preferred embodiment.

DETAILED DESCRIPTION OF THE INVENTION

Figure 2:
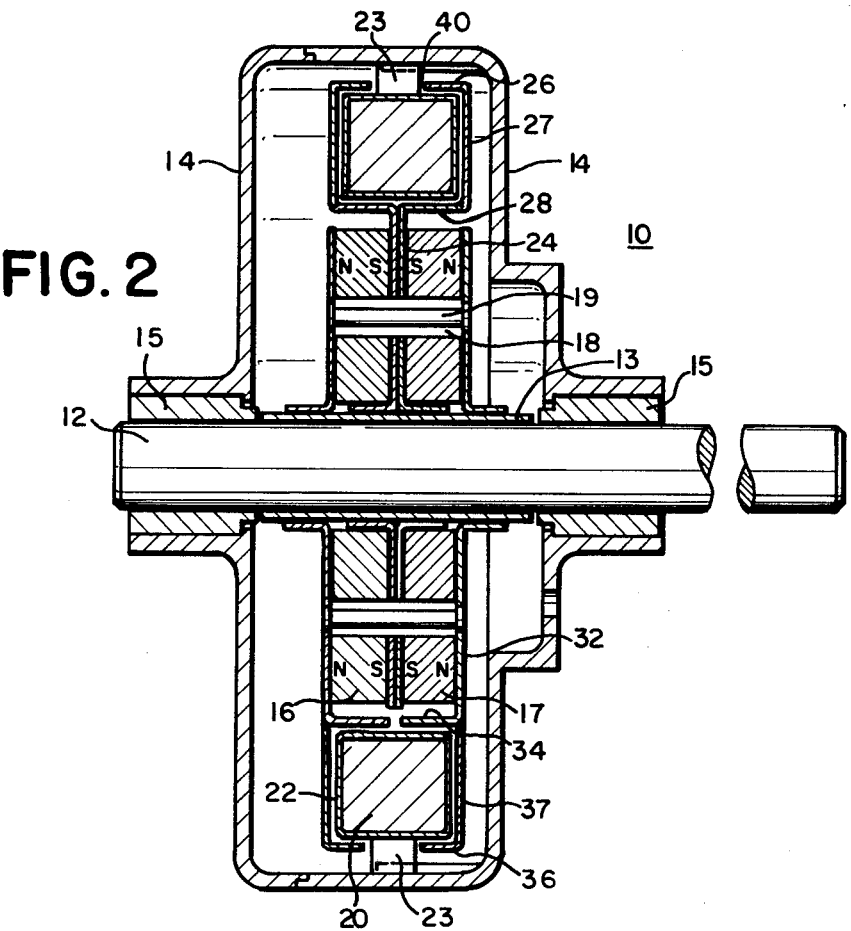
FIG. 2 is a partially sectioned view of an entire device according to the preferred embodiment.

Referring now to the drawings wherein like elements in different figures thereof have the same reference character applied thereto, an electromechanical device useful as a motor or as a generator is designated by the reference numeral 10. In FIG. 2, a shaft 12 is fitted with mounting sleeves 13 inside housing 14. Bearings 15 are provided to support rotation shaft 12. A pair of disc magnets 16 and 17 are poled to have opposite polarity on the faces, and are mounted on shaft 12 to define a rotor. Two south polarity faces of magnets 16 and 17 are positioned facing each other so that the outer faces have north polarity. An alignment bushing 18 provides a location for fastening bolts through the holes defined by axis 19.

The toroid core 20 is fitted with toroid windings 22 of conventional construction, and mounted to housing 14 via supports 23 to form the stator. As will be explained herein, a first pole shoe 24 contacts the south polarity face of the magnet 17 and has a portion extending radially away from magnet 17 to define a cup shaped virtual south poles as described by members 26, 27 and 28. Similarly, pole shoe 32 contacts the outer or north polarity face of magnet 17 and extends radially from magnet 17 to define a pair of north polarity virtual poles at 34, 36 and 37. The toroid stator 20 is positioned annularly around magnets 16 and 17 so that first pole shoe 24 and second pole shoe 32 surround portions of the windings 22 with alternating south and north polarity from the virtual poles. Means 40 are provided for electrical contact with the stator, of conventional design, to permit flow of current into or out of the device as it operates as a motor or generator. Similarly, a second set of shoes is positioned around the magnets, as will be clear from FIG. 3 or FIG. 4.

Figure 1:
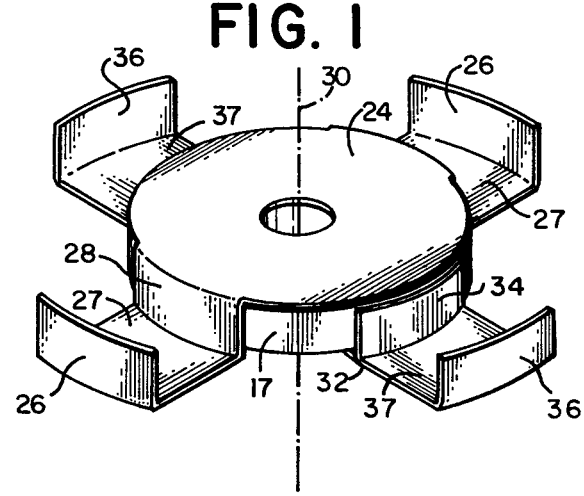
FIG. 1 is a perspective view of part of the preferred embodiment.

The preferred design of the pole shoes and their relationship is shown in FIG. 1. A disc magnet 17 has one face of one polarity covered with a first pole shoe 24, which has extended radially from the magnet on outer edge 26, cavity 27 and inside edge 28. The edge 26, cavity 27 and inside 28 defines a chamber into which the stator toroid 20 is placed. Similarly, the second pole shoe has a face 32 in contact with the outside or other face of magnet 17, thereby having opposite polarity. Pole shoe outside edge 36, interconnecting edge 37 and inside edge 34, define a chamber of opposite polarity, thereby providing alternating north and south virtual poles in dynamic relationship with the stator. FIG. 2 represents a partial section view, so that a typical magnet with its pole shoes and cavity forming edges can be visualized. Thus, in FIG. 2, pole shoe 24 surrounds toroid 20 at the top thereof via outside edge 26, interconnecting edge 27 and inside edge 28. A pair of shoes, 24 and 24a, are oriented in space to form co-operatively virtual south pole chambers. The chamber essentially completely surrounds toroid 20 such that nearly all of the winding is within the field and is electrically active, except for a small space for mounting the toroid. In the lower portion of FIG. 2, pole shoe 32 is shown with outside edge 36, interconnecting member 37 and inside edge 34 defining a cavity in the same manner. Again, with a pair of pole shoes, 32 and 32a, the toroid 20 is nearly completely surrounded by the virtual north pole cavity.

In FIG. 3, a pair of pole shoes 24 and 24a are in contact with disc magnets 17 and 16 (without the attendant shaft and the like) such that toroid 20 is encased by inner edges 28 and 28a, interconnecting edges 27 and 27a, and outer edges 26 and 26a. Since magnets 16 and 17 have the same polarity facing each other, the toroid 20 is enclosed by virtual poles of this same polarity. Likewise, in FIG. 4, a pair of pole shoes 32 and 32a surround magnets 17 and 16, with inner edge 34 and 34a, outer edge 36 and 36a and interconnecting members 37 and 37a surrounding the toroid 20 with virtual north pole cavity of the same polarity as the outer faces of magnets 16 and 17. Thus the stator is subjected to alternating regions of north and south polarity, with nearly all of the toroid winding 22 in the influence of the virtual poles. In FIG. 5, it is clear that toroid 20 and toroid winding 22 are subjected to virtual poles from arrows 39, 39a, 39b and 39c as current passes along winding 22 in direction of arrows 38, 38a, 38b and 38c. Clearly at least 95 and virtually 100% of the winding is within the field, and is electrically active.

It is understood that the above described embodiments are merely illustrative of the application of the principles of this invention. Numerous other embodiments may be devised by those skilled in the art without departing from the spirit and scope of this invention as defined by the appended claims.

I claim:

1. An electromechanical device, comprising:
    a housing, including bearing means to support a rotatable shaft;
    a pair of disc magnets poled to have opposite polarity on their faces, and positioned to have faces of a first polarity facing each other and faces of a second polarity facing outwards;

at least one first pole shoe positioned to contact both of said two inner disc magnet faces which are facing each other and having portions extending radially from said faces to define a pair of virtual pole chambers of the same polarity as the inner faces;

at least one second pole shoe pair positioned to contact both of said two outer faces and having portions extending radially from said faces to define a pair of virtual pole chambers of the same polarity as the outer faces;

a toroid stator mounted on said housing and having windings thereon, said stator being positioned annularly around said disc magnets such that the virtual poles surround portions of said windings with alternating fields of polarity.

2. The device of claim 1 which includes at least two first pole shoes and at least two pair of second pole shoes positioned to surround said toroid with virtual pole chambers of alternating polarity.

3. The device of claim 1 wherein said first pole shoe has a flat portion covering the one face of said disc magnet and a pair of cup portions extending radially from the periphery of said face to define a chamber sized to accept said toroid.

4. The device of claim 3 wherein said second pole shoe has a flat portion covering the other face of said disc magnet and a pair of cup portions extending radially from the periphery of said face to define a chamber sized to accept said toroid.

5. The device of claim 4 wherein the length of active winding on said toroid adjacent the cup portions is substantially all of the total winding length, exclusive of allowance for mounting said toroid.

6. The device of claim 1 wherein said first pole shoe has a flat portion contacting the two inner faces of said two magnets and a pair of cup portions extending radially from the periphery of said faces to define a chamber sized to accept said toroid.

7. The device of claim 6, wherein said second pole shoe pair has a flat portion contacting the outer faces of said disc magnets and a pair of cup portions extending radially from the periphery of said faces to define a chamber sized to accept said toroid.

8. The device of claim 7 which includes at least two first pole shoes and at least two pair of second pole shoes positioned to present alternating polarity to said toroid.

* * * * *